United States Patent
Ichikawa et al.

(10) Patent No.: US 9,398,230 B2
(45) Date of Patent: Jul. 19, 2016

(54) IMAGING DEVICE AND IMAGING METHOD

(71) Applicant: Olympus Corporation, Shibuya-ku, Tokyo (JP)

(72) Inventors: Manabu Ichikawa, Hachioji (JP); Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/612,761

(22) Filed: Feb. 3, 2015

(65) Prior Publication Data
US 2015/0244931 A1 Aug. 27, 2015

(30) Foreign Application Priority Data
Feb. 27, 2014 (JP) .................................. 2014-036340

(51) Int. Cl.
| H04N 5/235 | (2006.01) |
| H04N 5/232 | (2006.01) |
| H04N 5/262 | (2006.01) |
| H04N 5/265 | (2006.01) |

(52) U.S. Cl.
CPC ......... H04N 5/2356 (2013.01); H04N 5/23222 (2013.01); H04N 5/23232 (2013.01); H04N 5/265 (2013.01); H04N 5/2621 (2013.01)

(58) Field of Classification Search
CPC . H04N 5/2356; H04N 5/2322; H04N 5/2621; H04N 5/23229; H04N 5/265
See application file for complete search history.

(56) References Cited

U.S. PATENT DOCUMENTS

| 6,614,998 | B1* | 9/2003 | Senba | H04N 5/2356 396/123 |
| 2008/0259176 | A1 | 10/2008 | Tamaru | |
| 2009/0047010 | A1* | 2/2009 | Yoshida | H04N 5/2356 396/127 |
| 2009/0059057 | A1* | 3/2009 | Long | H04N 5/2356 348/343 |
| 2011/0298964 | A1* | 12/2011 | Hikida | H04N 5/2356 348/345 |
| 2013/0044254 | A1* | 2/2013 | Tzur | G06T 7/0069 348/345 |
| 2014/0002693 | A1* | 1/2014 | Nestares | H04N 5/2356 348/239 |
| 2014/0204236 | A1* | 7/2014 | Yoon | H04N 5/2356 348/222.1 |

* cited by examiner

*Primary Examiner* — Jason Flohre
(74) *Attorney, Agent, or Firm* — John C. Pokotylo; Straub & Pokotylo

(57) ABSTRACT

An imaging device according to the present invention includes: an imaging circuit to obtain image data by imaging an object; an image synthesis circuit to synthesize synthesis image data using the image data; an image synthesis estimation circuit to estimate whether an object possibly to be synthesized is included or not in the image synthesis circuit; and an image capturing instruction circuit to instruct the imaging circuit to capture an image, wherein the image capturing instruction circuit instructs the imaging circuit to capture a plurality of images according to an estimation result of the image synthesis estimation circuit.

8 Claims, 7 Drawing Sheets

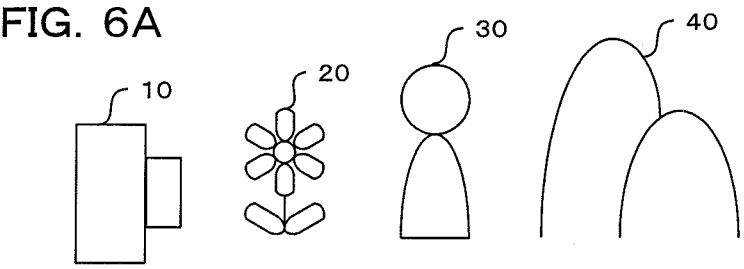
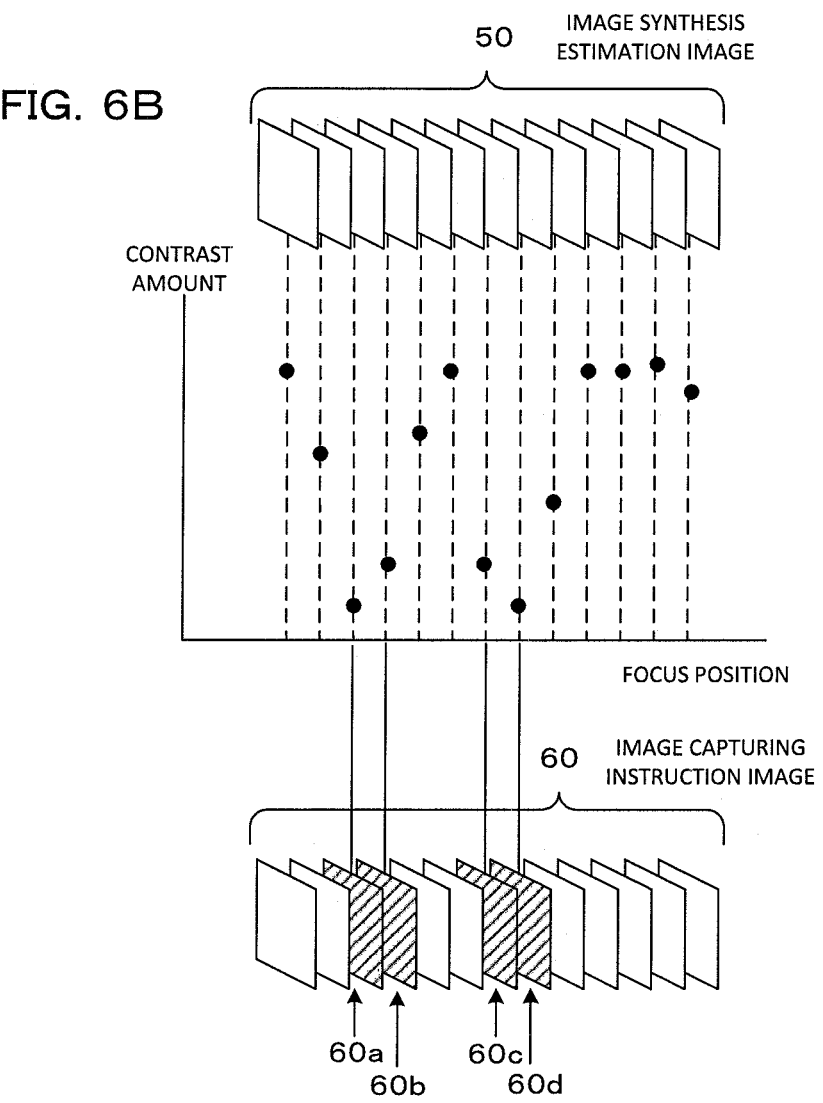

IMAGING DEVICE AND IMAGING METHOD

Benefit is claimed, under 35 U.S.C. §119, to the filing date of prior Japanese Patent Application No. 2014-036340 filed on Feb. 27, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method in which a plurality of images can be combined to generate a synthesis image.

2. Description of the Related Art

An imaging device such as a digital camera is sold in the market mounting a function of capturing a plurality of images, combining this plurality of images, and thereby realizing an image quality which cannot be expressed by one image.

As a technique of combining the plurality of images, there is proposed a technique of capturing the plurality of images while shifting a focus position, for example, performing alignment of object positions to combine the images using a plurality image data sets obtained by this image capturing, and thereby generating an all-focused image or an obscure-controlled image (refer to Japanese Patent Laid-Open Publication No. 2008-271240 (patent literature 1).

SUMMARY OF THE INVENTION

The present invention aims to provide an imaging device and an imaging method in which as many captured images as possible are secured and a synthesis image having a sufficiently high image quality can be generated.

An imaging device according to the present invention includes: an imaging circuit to obtain image data by imaging an object; an image synthesis circuit to synthesize synthesis image data using the image data; an image synthesis estimation circuit to estimate whether an object possibly to be synthesized is included or not in the image synthesis circuit; and an image capturing instruction circuit to instruct the imaging circuit to capture an image, wherein the image capturing instruction circuit instructs the imaging circuit to capture a plurality of images according to an estimation result of the image synthesis estimation circuit.

An imaging method according to the present invention includes: an imaging step of obtaining image data by imaging an object in an imaging circuit; an image synthesis step of combining a plurality image data sets obtained in the imaging step; an image synthesis estimation step of estimating whether the object possibly to be synthesized is included or not in the image synthesis step; and an image capturing instruction step of instructing the imaging circuit to capture an image, wherein the image capturing instruction step instructs the imaging step to capture a plurality of images according to an estimation result of the image synthesis estimation step.

BRIEF DESCRIPTION OF THE DRAWINGS

FIG. 6A and FIG. 6B are diagrams explaining image synthesis estimation to be performed using contrast in a camera according to one embodiment of the present invention.

DETAILED DESCRIPTION OF THE PREFERRED EMBODIMENTS

Hereinafter, there will be explained an application example for a digital camera as an embodiment of the present invention. This digital camera includes an imaging circuit, converts an object image into image data by this imaging circuit, and performs live-view display of the object image on a display disposed on the rear side of a main body using this converted image data. A photographer determines a composition and a shutter chance by observing the live-view display. In release operation, the image data is recorded in a recording medium. The image data recorded in the recording medium can be reproduced and displayed on the display when a reproduction mode is selected.

Further, a camera according to one embodiment obtains image data while moving a photographic lens before image capturing (scanning), and does not perform the image capturing when a high contrast part is not extracted from the image data. Further, the camera predicts object motion from the image data obtained during the scanning, and, when an object is moving, does not perform the image capturing before and after a frame in which the contrast of the moving object is high. The camera performs image synthesis using a plurality image data sets obtained in the image capturing which is performed according to the above image capturing determination.

Figure 1:
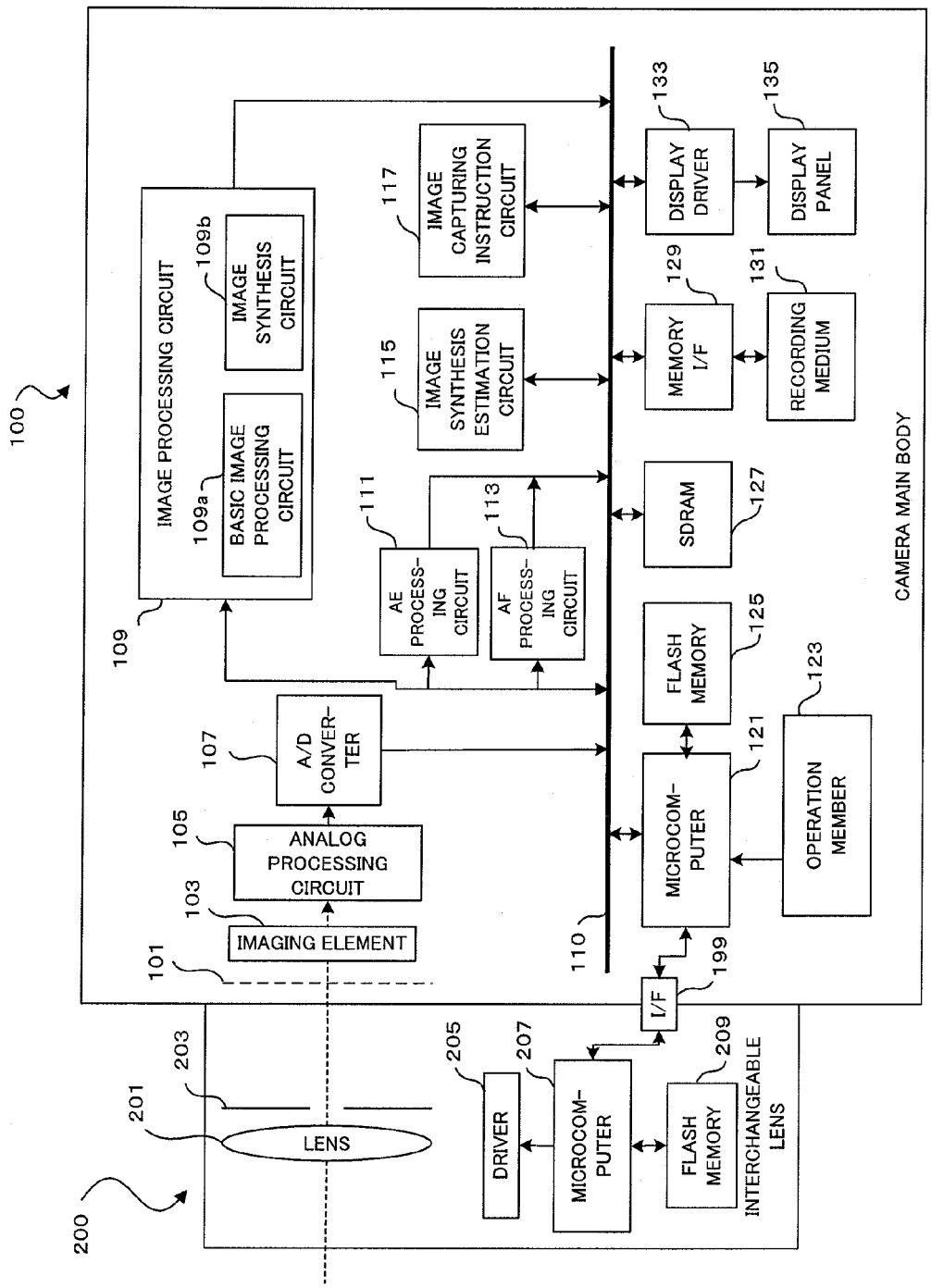
FIG. 1 is a block diagram mainly showing an electrical configuration of a camera according to one embodiment of the present invention.

FIG. 1 is a block diagram mainly showing an electrical configuration of a camera according to one embodiment of the present invention. This camera is configured with a camera main body 100 and an interchangeable lens 200 detachable from the camera main body 100. Note that, while the photographic lens is an interchangeable type in the present embodiment, not limited to this, obviously the camera may be a digital camera of a type fixing the photographic lens to the camera main body.

The interchangeable lens 200 is configured with a photographic lens 201, a diaphragm 203, a driver 205, a microcomputer 207, and a flash memory 209, and includes an interface (in the following, called I/F) 199 between the interchangeable lens 200 and the camera main body 100 to be described below.

The photographic lens 201 is configured with a plurality of optical lenses (including a focus lens for focus adjustment) for forming an object image, and is a fixed focus lens or a zoom lens. The diaphragm 203 is disposed on the back side of the photographic lens 201 on the optical axis, and the diaphragm 203 has a variable aperture diameter and limits a light amount of an object luminous flux passing through the photographic lens 201. Further, the photographic lens 201 can be moved by the driver 205 in the optical axis direction. The focus position of the photographic lens 201 is controlled by the movement of the focus lens within the photographic lens 201 according to a control signal from the microcomputer 207, and, in the case of the zoom lens, a focal length is also controlled. Further, the driver 205 also performs the control of the aperture diameter of the diaphragm 203.

The microcomputer 207 connected to the driver 205 is connected to I/F 199 and the flash memory 209. The microcomputer 207 operates according to a program stored in the flash memory 209, performs communication with a microcomputer 121 within the camera main body 100 to be described below, and controls the interchangeable lens 200 according to the control signal from the microcomputer 121.

The flash memory 209 stores various kinds of information such as optical characteristics and adjustment values of the interchangeable lens 200 other than the above program. I/F 199 is an interface for mutual communication between the microcomputer 207 within the interchangeable lens 200 and the microcomputer 121 within the camera main body 100.

A mechanical shutter 101 is disposed in the camera main body 100 on the optical axis of the photographic lens 201. This mechanical shutter 101 controls a passing time of the object luminous flux and employs a publicly known focal plane shutter or the like. An imaging element 103 is disposed at a position where an object image is formed by the photographic lens 201, on the back side of this mechanical shutter 101.

The imaging element 103 is a part of an imaging circuit to form the object image to obtain the image data. In the imaging element 103, photodiodes each configuring a pixel are disposed two-dimensionally in a matrix, and each of the photodiodes generates photoelectric conversion current according to a receiving light amount. This photoelectric conversion current is accumulated as electric charge by a capacitor connected to each of the photodiodes. An RGB filter having a Bayer array is disposed on the front face of the pixels. Further, the imaging element 103 includes an electronic shutter. The electronic shutter controls an exposure time by controlling a time from the charge accumulation to charge read-out in the imaging element 103. Note that obviously the imaging element 103 may be a stacked type such as Foveon (registered trade mark), for example, not limited to the Bayer array type.

The imaging element 103 is connected to an analog processing circuit 105, and this analog processing circuit 105 performs waveform shaping for a photoelectric conversion signal (analog image signal) which is read out from the imaging element 103, after having reduced reset noise and the like, and further performs gain-up so as to obtain an appropriate brightness. The analog processing circuit 105 is a part of the imaging circuit to capture the object image and obtain the image data.

The analog processing circuit 105 is connected to an A/D converter 107, and this A/D converter 107 performs analog-digital conversion of an analog image signal, and outputs a digital image signal (in the following, called image data) to a bus 110. Here, raw image data before image processing in an image processing circuit 109 is called RAW data in the present specification.

The bus 110 is a transfer path for transferring various kinds of data read out or generated within the camera main body 100 to the inside of the camera main body 100. The bas 110 is connected with the image processing circuit 109, an AE (Auto Exposure) processing circuit 111, an AF (Auto Focus) processing circuit 113, an image synthesis estimation circuit 115, an image capturing instruction circuit 117, the microcomputer 121, SDRAM 127, a memory interface (in the following, called memory I/F) 129, and a display driver 133, other than the above A/D converter 107.

The image processing circuit 109 includes a basic image processing circuit 109a to perform normal image processing and an image synthesis circuit 109b to perform image synthesis. When a plurality of images is combined, the basic image processing circuit 109a and the image synthesis circuit 109b are used. The image processing circuit 109 is provided with a hardware circuit such as ASIC (Application Specific Integrated Circuit) and DSP (Digital Signal Processor) for executing image processing to be described in the following, and executes the processing according to the control signal from the microcomputer 121. Here, the whole or a part of the image processing may be configured to be executed by the microcomputer 121 in a software-based manner. In this case, the microcomputer 121 functions as the image processing circuit.

The basic image processing circuit 109a performs optical black (OB) subtraction processing, white balance (WB) correction, synchronization processing which is performed in the case of Bayer data, color reproduction processing, gamma correction processing, color matrix operation, noise reduction (NR) processing, edge enhancement processing, and the like for the RAW data. When one image is captured and a special effect or the like is not set, the image processing is completed in the processing by this basic image processing circuit 109a.

The image synthesis circuit 109b performs various kinds of image synthesis according to set synthesis modes or the like. This image synthesis circuit 109b functions as an image synthesis circuit to synthesize synthesis image data using the image data from the imaging circuit. That is, the image synthesis circuit 109b performs the image data synthesis using a plurality of image data sets obtained under different conditions in a focal position, an aperture value, and the like. In the present embodiment, as will be described below, it is possible to set the synthesis mode such as depth synthesis of increasing field depth. When the depth synthesis mode is set, the image synthesis circuit 109b generates an image having a field depth different from a fixed-focus image, by performing alignment and combining for the plurality of image data sets captured at a plurality of focus positions.

Here, while not shown in the drawing, the image processing circuit 109 includes an image compression circuit and an image decompression circuit. The image compression circuit compresses the image data read out from SDRAM 127 according to each of various kinds of compression method such as a JPEG compression method or the like for a still image and MPEG or the like for a video image, when recording the image data into a recording medium 131.

Further, the image decompression circuit performs also the decompression of JPEG image data and MPEG image data for image reproduction. In the decompression, the image decompression circuit reads out a file recorded in the recording medium 131, provides decompression processing, and then temporarily stores the decompressed image data into SDRAM 127. Her, while the present embodiment employs the JPEG compression method or the MPEG compression method as the image compression method, the compression method is not limited to these methods, and obviously another compression method such as TIFF and H.264 may be employed. Further, the compression method may be either a reversible compression type or an irreversible compression type.

The AE processing circuit 111 measures object brightness using the image data input via the bus 110, and outputs this object brightness information to the microcomputer 121 via the bus 110. While a dedicated photometric sensor may be provided for the measurement of the object brightness, the present embodiment calculates the object brightness using the image data.

The AF processing circuit 113 extracts a high-frequency component signal from the image data, obtains a focus evaluation value by integration processing, and outputs the result to the microcomputer 121 via the bus 110. The present embodiment performs focusing of the photographic lens 201 by a so-called contrast method. While an example of the AF control by the contrast method is explained in this embodiment, the object luminous flux may be divided, a phase difference sensor may be provided on the optical path thereof or on an imaging element, and the focusing may be performed by the AF control using phase difference AF.

The image synthesis estimation circuit 115 instructs the imaging circuit to capture a plurality of images in a plurality of different conditions, and obtains a plurality of estimation image data sets to be used in the estimation of the image synthesis. When having obtained this estimation data, the image synthesis estimation circuit 115 analyzes this estimation data and determines whether or not to perform the image synthesis according to the plurality of conditions. The plurality of conditions includes a plurality conditions in a focus position of the focus lens, an aperture value, a shutter speed value, an exposure amount, or the like, for example. Here, the function of the image synthesis estimation circuit 115 may be configured not to be executed by a circuit configured independently from the microcomputer 121 but to be executed by the microcomputer 121 in a software-based manner. In this case, the microcomputer 121 functions also as the image synthesis estimation circuit.

In the present embodiment, there will be explained an example of changing the focus position of the focus lens for the plurality of conditions. That is, while imaging is performed in a plurality of times in actual image capturing, in advance of the actual image capturing, the present embodiment performs imaging while sequentially changing the focus position of the focus lens, and analyzes contrast and object motion in each of the images obtained at this time, and determines whether each of the images is suitable or not for the synthesis image depending on this analysis result.

This image synthesis estimation circuit 115 functions as an image synthesis estimation circuit to estimate whether an object possibly to be synthesized is included or not in the image synthesis circuit. Further, the image synthesis estimation circuit 115 instructs the imaging circuit to capture the plurality of images in the plurality of conditions, obtains the plurality of estimation image data sets to be used for the estimation, analyzes the plurality of estimation image data sets, and thereby determines whether or not to perform the image synthesis according to the plurality of conditions (in detail, refer to FIG. 5 to FIG. 7C). The plurality of different conditions is obtained by the focus position change of the focus lens, for example.

The image capturing instruction circuit 117 instructs the imaging circuit to capture a plurality of images on receiving the estimation result from the image synthesis estimation circuit 115. That is, since the image synthesis estimation circuit determines whether each of the images obtained before the actual image capturing is suitable or not for the synthesis image in the present embodiment, the image capturing instruction circuit 117 causes the imaging to be performed when the image is suitable for the synthesis image, and not to be performed when the image is not suitable for the synthesis image.

The image capturing instruction circuit 117 functions as an image capturing instruction circuit to instruct the imaging circuit to perform the image capturing. Further, this image capturing instruction circuit instructs the imaging circuit to perform the image capturing in a plural of times according to the estimation result in the image synthesis estimation circuit. Here, the function of the image capturing instruction circuit 117 may be configured not to be executed by a circuit configured independently from the microcomputer 121, but to be executed by the microcomputer 121 by a software-based manner. In this case, the microcomputer 121 functions also as the image capturing instruction circuit.

The microcomputer 121 performs the function of a control section for the whole of this camera, and controls various kinds of sequence of the camera in a comprehensive manner according to a program stored in a flash memory 125. The microcomputer 121 is connected with an operation member 123 and the flash memory 125 other than the above I/F 199.

The operation member 123 includes operation members such as various kinds of button and various kinds of input key like a power switch, a release button, a movie button, a replay button, a menu button, and a cross key, and detects an operation state in each of these operation members and outputs a detection result to the microcomputer 121. The microcomputer 121 executes the various kinds of sequence according to user operation using a detection result of the operation by the operation member 123. The power button is an operation member for providing an ON/OFF instruction for a power supply of this camera. When the power button is pressed, the power supply of the digital camera is turned on, and, when the power button is pressed again, the power supply of the digital camera is turned off.

The release button is configured with a first release switch which is turned on when the release button is half-pressed and a second release switch which is turned on when the release button is pressed from the half-pressed state into a fully-pressed state. The microcomputer 121 executes an image capturing preparation sequence such as AE operation and AF operation when the first switch is turned on. Further, when the second switch is turned on, the microcomputer 121 executes a series of image capturing sequence of controlling the mechanical shutter 101, obtaining the image data based on the object image from the imaging element 103 or the like, and recording this image data into the recording medium 131, to perform the image capturing.

The movie button is an operation button for start and termination instructions of the video image capturing, starts the video image capturing when the movie button is operated first, and terminates the video image capturing when the button is operated again. The replay button is an operation button for setting and releasing the reproduction mode, and image data of the captured image is read out from the recording medium 131 and the captured image is reproduced and displayed on a display panel 135 when the reproduction mode is set.

The menu button is an operation button for causing a menu screen to be displayed on the display panel 135. Various kinds of camera setting can be performed on the menu screen. The camera setting includes synthesis modes such as HDR synthesis, depth synthesis, and ultra resolution synthesis, for example.

The flash memory 125 stores a program for executing the various kinds of sequence of the microcomputer 121. The microcomputer 121 controls the whole camera according to this program.

SDRAM 127 is an electrically rewritable volatile memory for temporarily storing the image data and the like. This SDRAM 127 sores the image data output from the A/D converter 107, and the image data processed in the image processing circuit 109 and the like.

The memory I/F 129 is connected to the recording medium 131, and controls the read and write of data such as the image data and a header attached to the image data from and into the recording medium 131. While the recording medium 131 is a recording medium such as a memory card detachable from the camera main body 100, for example, the recording medium 131 is not limited to the memory card and may be a hard disk or the like built in the camera main body 100. The recording medium 131 functions as an image recording section to record the synthesis image data.

The display driver 133 is connected to the display panel 135, and displays an image on the display panel 135 according to the image data which is read out from SDRAM 127 or the recording medium 131 and decompressed by the image decompression circuit in the image processing circuit 109. The display panel 135 is disposed on the rear face of the camera main body 100 or the like, and performs image display. Since, the display surface of the display panel 135 is disposed at the external part of the camera main body such as the rear face, the display panel 135 is a display section easily receiving an influence of external light, but it is possible to set a large size display panel. Here, as the display panel, it is possible to employ various kinds of display panel such as a liquid crystal display panel (LCD and TFT) and an organic EL display panel.

The image display on the display panel 135 includes recording view display for displaying the image data to be recorded for a short time just after the image capturing, reproduction display for displaying the image file of a still image or a video image recorded in the recording medium 131, and video image display such as live view display.

Next, main processing of the camera in the present embodiment will be explained by the use of the flowcharts shown in FIG. 2 and FIG. 3. Here, the microcomputer 121 executes the flowcharts shown in FIG. 2, FIG. 3, and FIG. 4 and FIG. 5 to be described below, by controlling each of the sections according to the program stored in the flash memory 125.

Figure 2:
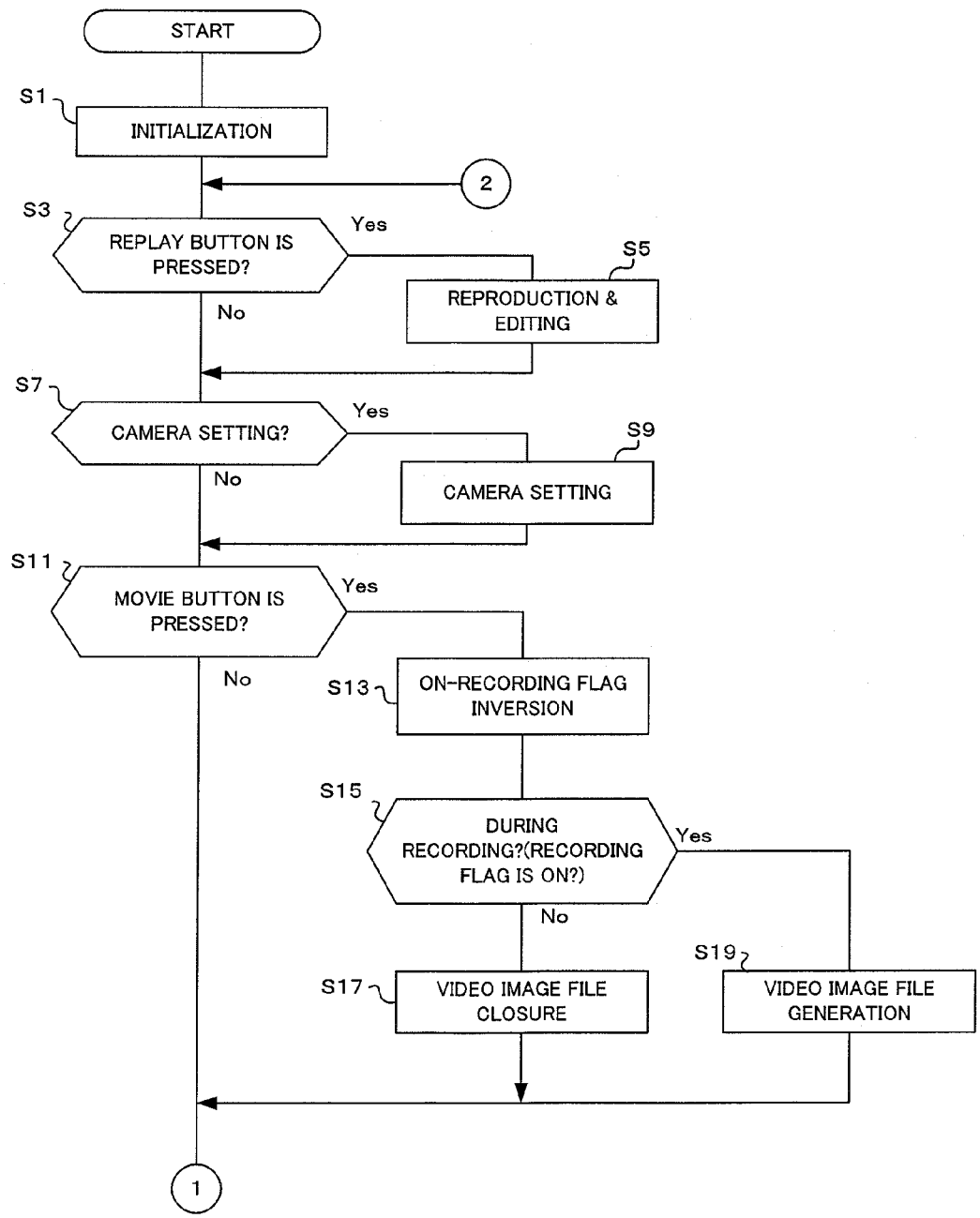
FIG. 2 is a flowchart showing a main operation of a camera according to one embodiment of the present invention.
Figure 3:
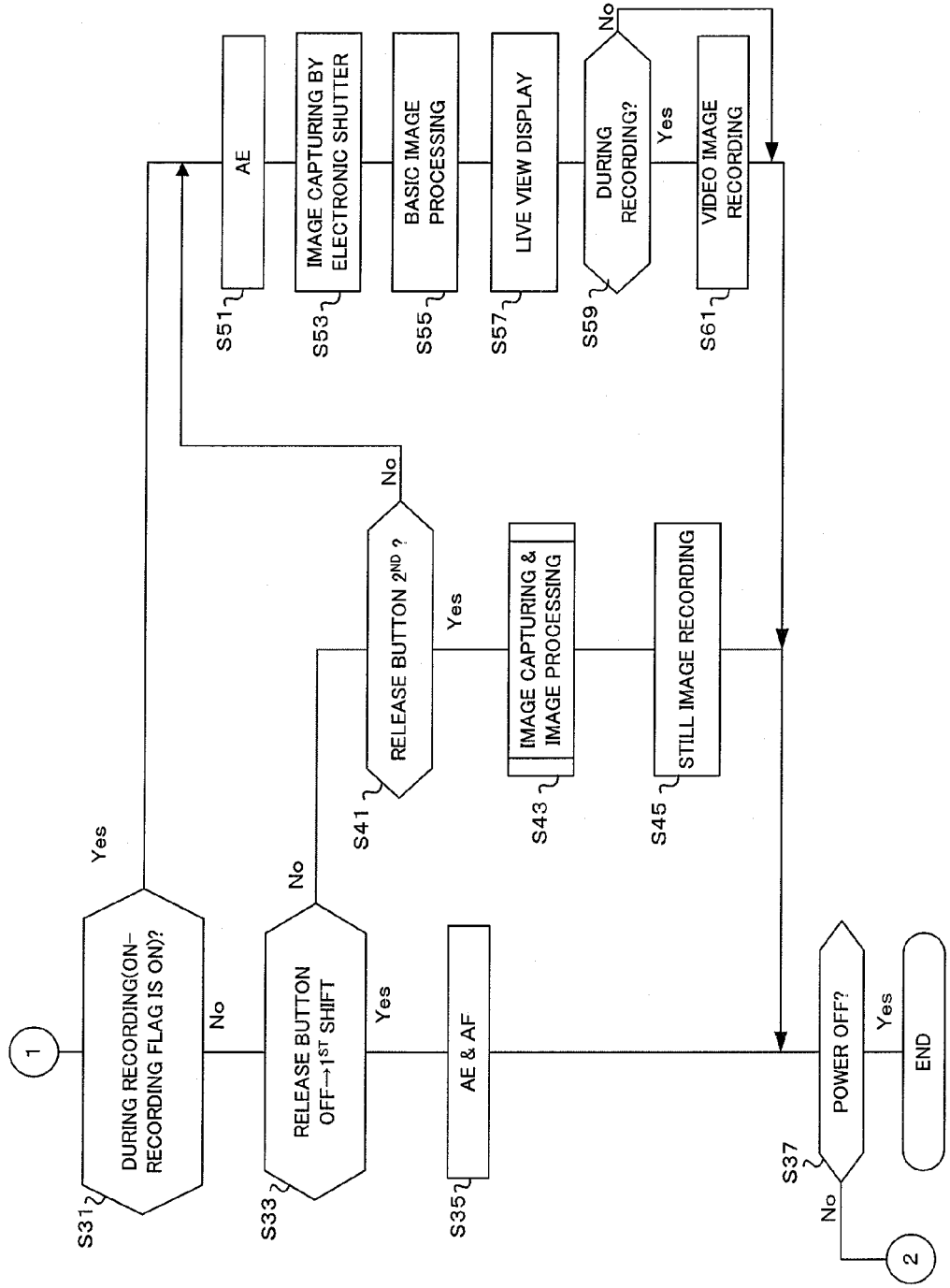
FIG. 3 is a flowchart showing a main operation of a camera according to one embodiment of the present invention.

When the power button in the operation member 123 is operated and the power supply is turned on, the main flow shown in FIG. 2 start to be operated. When the operation is started, first initialization is performed (S1). For the initialization, mechanical initialization and electrical initialization such as the initialization of various kinds of flag and the like are performed. As one of the various kinds of flag, an on-recording flag indicating whether the video image is being recorded or not is reset (refer to step S13, S15, S31 and the like).

After initialization, next it is determined whether the replay button is pressed or not (S3). Here, the operation state of the replay button in the operation member 123 is detected and the determination is performed. When the replay button is pressed in the result of this determination, reproduction & editing is executed (S5). Here, the image data is readout from the recording medium 131 and a list of the still images and the video images is displayed on LCD 135. A user selects an image from the list by operating the cross key, and decides the image using an OK button. Further, it is possible to edit the selected image.

After reproduction & editing in step S5, or when the replay button is not pressed in the result of the determination in step S3, it is determined whether camera setting is to be performed or not (S7). When the menu button in the operation member 123 is operated, camera setting is performed on the menu screen. In this step, it is determined thereby whether this camera setting is to be performed or not.

When the camera setting is determined to be performed in the result of the determination in step S7, camera setting is performed (S9). As described above, it is possible to perform the various kinds of camera setting on the menu screen. In camera setting, as described above, it is possible to set a mode such as normal image capturing, the HDR synthesis, the depth synthesis, and the ultra resolution synthesis as an image capturing mode, for example. Further, as a still image recording mode, it is possible to set a mode such as JPEG recording, TIFF recording, JPEG-RAW recording, and RAW recording. As a video image recording mode, it is possible to set a mode such as Motion JPEG recording and H.264 recording. As an image quality mode, it is possible to set a mode such as Fine and Normal.

After camera setting in step S9, or when the result of the determination in step S7 does not indicate the camera setting, next it is determined whether the movie button is pressed or not (S11). Here, the microcomputer 121 inputs the operation state of the movie button from the operation member 123 to perform the determination.

When the movie button is pressed in the result of the determination in step S11, on-recording flag inversion is performed (S13). An on-recording flag is set to ON (1) during video image is being captured, and reset to OFF (0) when the video image is not captured. In this step, when the flag is inverted, that is, set to ON (1), the flag is inverted to OFF (0), and, when the flag is set to OFF (0), the flag is inverted to ON (1).

After on-recording flag inversion in step S13, next it is determined whether video image recording is being performed or not (S15). Here, the determination is performed depending on whether the on-recording flag which has been inverted in step S13 is set to ON or OFF.

When the video image is being recorded in the result of the determination in step S15, a video image file is generated (S19). While the video image is recorded in step S61 to be described below, in this step, the video image file for recording a video image is generated and it is prepared to record the image data of the video image.

On the other side, when the video image is not being recorded in the result of the determination, the video image file is closed (S17). Since the movie button has been operated and the video image capturing has been terminated, the video image file is closed in this step. When the video file is closed, file write-in is terminated after the number of frames has been recorded in a header of the video image file or the like and thereby the video file is caused to have a state of reproduction capability.

When the video image file is closed in step S17, or when the video image file is generated in step S19, or when the movie button is not pressed in the result of the determination in step 11, next it is determined whether the video image is being recorded or not (S31). In this step, as in step S15, the determination is performed depending whether the on-recording flag is ON or OFF.

When the video image is not being recorded in the result of the determination in step S31, it is determined whether the release button is half-pressed or not, in other words, whether the first release switch is shifted from OFF to ON or not (S33). The state of the first release switch which operates together with the release button is detected from the operation member 123, and the above determination is performed depending on the result of this detection. When the first release switch is shifted from OFF to ON in the result of the detection, the determination result is YES, and, on the other side, when the ON state or the OFF state is kept, the determination result is NO.

When the release button is half-pressed and shifted from OFF to ON in the result of the determination in step S33, the operation of AE & AF is executed (S35). Here, the AE processing circuit 111 detects the object brightness from the image obtained by the imaging element 103, and calculates the shutter speed, the aperture value, and the like for appropriate exposure according to this object brightness.

Further, in step S35, the operation of AF is performed. Here, the driver 205 is caused to move the focus position of the photographic lens 201 via the microcomputer 207 in the interchangeable lens 200 so that the focus evaluation value obtained by the AF processing circuit 113 has a peak value. Accordingly, when the video image capturing is not being performed and the release button is half-pressed, the focusing of the photographic lens 201 is performed at this time point. After that, the process goes to step S37.

When the release button is not shifted from OFF to the first release in the result of the determination in step S31, next it is determined whether or not the release button is full-pressed and the second release switch is turned on (S41). In this step, the state of the second release switch which operates together with the release button is detected from the operation member 123, and the determination is performed depending on the result of this detection.

When the release button is fully-pressed and the second release switch is turned on in the result of the determination in step S41, image capturing & image processing is performed (S43). Here, the diaphragm 203 is controlled to have the aperture value calculated in step S33, and the shutter speed of the mechanical shutter 101 is controlled to have the calculated shutter speed. Then, when an exposure time corresponding to the shutter speed elapses, an image signal is read out from the imaging element 103, and RAW data is processed by the analog processing circuit 105 and the A/D converter 107 to be output to the bus 110.

Further, when the depth synthesis mode is set, in advance of the actual image capturing, it is determined whether an image suitable for the synthesis exists or an image unsuitable for the synthesis exists, while the focus lens is being moved. According to the result of this determination, the actual image capturing is performed at a focus position corresponding to the image suitable for the synthesis, and the plurality image data sets is obtained. Detailed operation of image capturing & image processing when the depth synthesis mode is set will be described below by the use of FIG. 4.

Further, in step S43, the image processing is performed after the image capturing. The RAW data obtained by the imaging element 103 is read out and subjected to the image processing by the image processing circuit 109. Further, when the image synthesis mode is set, in this step, the image capturing is performed in a plurality of times depending on the image synthesis mode, and the image data to be used for the image synthesis is saved temporarily to the recording medium 131 or the like. Detailed operation of this image capturing & image processing will be described below by the use of FIG. 4.

After image capturing & the image processing, next still image recording is performed (S45). Here, the image data of a still image subjected to the image processing is recorded into the recording medium 131. When the still image is recorded, the recording is performed in a set format. When JPEG is set, the image data subjected to the image processing is JPEG-compressed in the image compression circuit for the recording. In the case of the TIFF format, the image data is converted into RGB data and recorded in an RGB format. Further, when RAW recording is set and the synthesis is performed by the use of RAW data obtained by the image capturing, the synthesis RAW data is also recorded. While the recording destination of the image data may be the recording medium 131 in the camera main body, the image data may be configured to be recorded into an external device via a communication circuit (not shown in the drawing).

When release button 2nd is not performed in the result of the determination in step S41, or when the video image is being recorded in the result of the determination in step S31, next AE is performed (S51). The case of NO in the determination of above step S41 means that any operation is not performed for the release button, and live view display is performed in this case in step S57 to be described below. Further, in the case of YES in above step S31, the video image is being recorded. In this step, the shutter speed of the electronic shutter and the ISO sensitivity in the imaging element 103 are calculated for the purpose of performing the live view display or the video image capturing at an appropriate exposure.

After AE, next image capturing by electronic shutter is performed (S53). Here, an object image is converted into the image data. That is, the image data is obtained by means of performing charge accumulation during an exposure time determined by the electronic shutter of the imaging element 103 and reading out the accumulated charge after the exposure time has elapsed.

After image capturing by electronic shutter, next the image processing is performed for the obtained image data (S55). In this step, the basic image processing circuit 109a performs the basic image processing such as the WB correction, the color matrix operation, the gamma conversion, the edge enhancement, and the noise reduction.

After the basic image processing, next live view display is performed (S57). In this step, the live view display is performed on the display panel 135 using the image data subjected to basic image processing in step S55. That is, since the image data has been obtained and subjected to the image processing in step S53, the live view display is updated using this processed image data. The photographer can determine the composition and the shutter timing by observing this live view display.

After live view display in step S57, next it is determined whether the video image is being recorded or not (S59). Here, it is determined whether the on-recording flag is ON or not. When the video image is being recorded in the result of this determination, video image recording is performed (S61). Here, the image data read out from the imaging element 103 is subjected to the image processing for the video image data and recorded into the video image file.

After video image recording in step S61, when the video image is not being recorded in the result of the determination in step S59, after still image recording in step S45, or after AE & AF instep S35, next it is determined whether the power supply is to be turned off or not (S37). In this step, it is determined whether the power button in the operation member 123 is pressed again or not. When the power supply is not to be turned off in the result of this determination, the process returns to step S3. On the other side, when the power supply is to be turned off, the termination operation of the main flow is performed and then this main flow is terminated.

In this manner, the main flow of one embodiment of the present invention can set the image capturing mode of combining the plurality of image data sets such as the depth synthesis mode (S9), and, when the depth synthesis mode is set, does not perform the image capturing at the focus position which is not suitable for the synthesis image and performs the image capturing at the focus position suitable for the synthesis image (S43).

Figure 4:
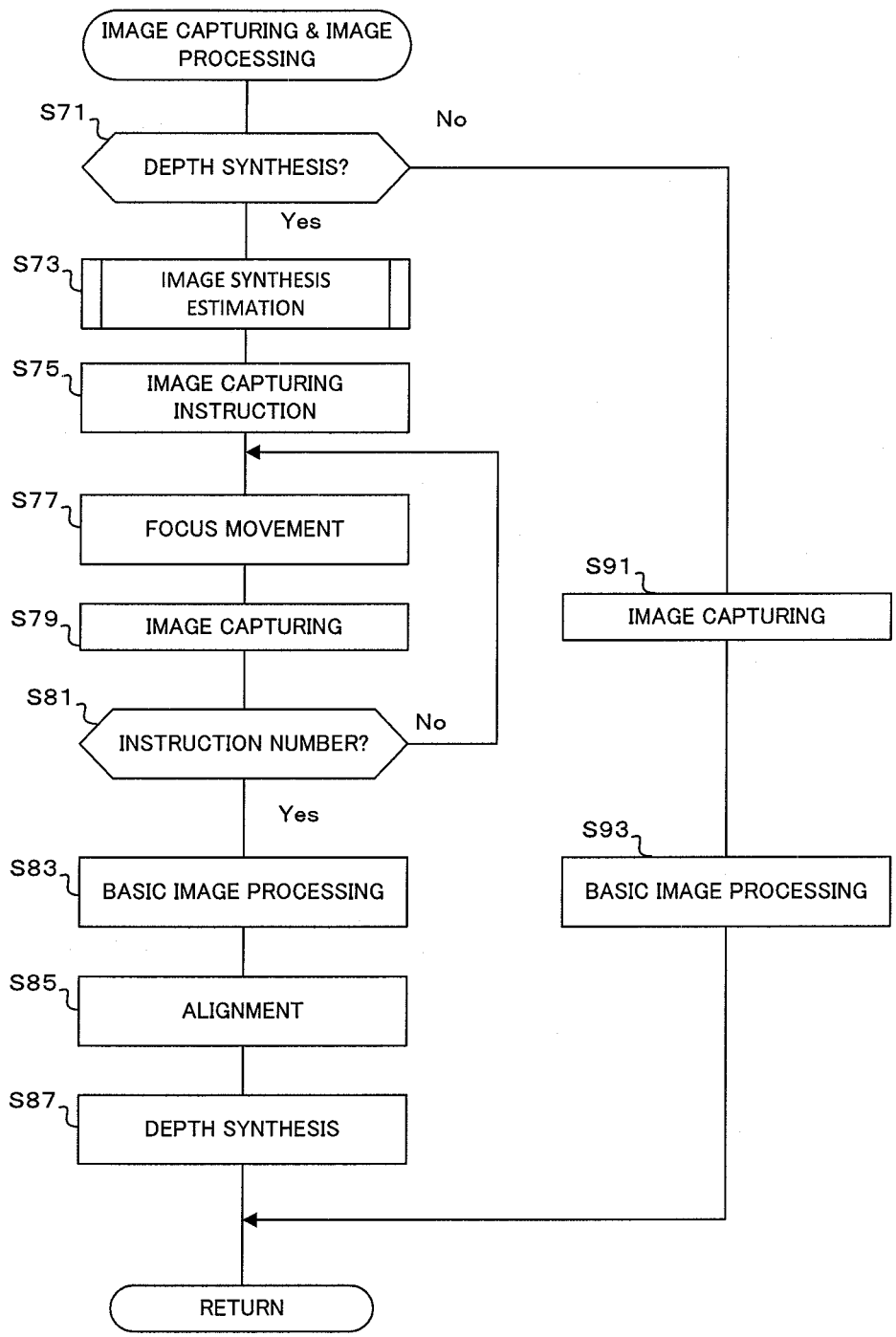
FIG. 4 is a flowchart showing the operation of image capturing & image processing in a camera according to one embodiment of the present invention.

Next, image capturing & image processing in step S43 will be explained in detail by the use of FIG. 4. When the flow of image capturing & image processing is started, first it is determined whether the depth synthesis is set or not (S71). In this step, it is determined whether the depth synthesis mode is set or not in step S9.

When the depth synthesis mode is not set in the result of the determination in step S71, image capturing is performed (S91). Here, the image capturing is performed by the imaging element 103 at the exposure control value and the focus position determined in step S35, and the image data is obtained. After image capturing, next basic image processing is performed (S93). Here, the basic image processing circuit 109a provides the image processing such as OB subtraction processing, the WB correction, the color matrix operation, the gamma conversion, the edge enhancement, and the noise reduction for the image data obtained in step S91.

On the other side, when the depth synthesis mode is set in the result of the determination in step S71, image synthesis estimation is performed (S73). Here, the image synthesis estimation circuit 115, in advance of actual image capturing in step S79, obtains the image data while moving the focus lens, and determines whether the image is suitable or not for the synthesis image. That is, the image synthesis estimation circuit 115 performs the image capturing while changing the condition of the focus lens such as the focus position. The number of images to be captured and the contents of the condition change here may be changed according to the image capturing condition when the second release switch is turned on, for example, the focus position and object distance. It is determined from the captured image whether the image synthesis is to be performed or not in each of the plurality of conditions. The determination whether the image synthesis is to be performed or not is performed depending on the contrast in the image which is analyzed by the use of the image obtained by the focus position movement. Further, the determination whether the image synthesis is to be performed or not is performed depending on a movement amount of the object which is analyzed by the use of the captured image and the just previously captured image. The determination whether the image synthesis is to be performed or not is performed by one of the above methods or by both of the above methods. Whether the image capturing is to be performed or not is stored for each of the focus positions according to this determination. This image synthesis estimation will be described below in detail by the use of FIG. 5 to FIG. 7C.

After image synthesis estimation, next image capturing instruction is performed (S75). Here, the image capturing instruction circuit 117 provides the image capturing instruction for the imaging circuit according to the determination result in image synthesis estimation of step S73. That is, in the image capturing, the image capturing instruction circuit 117 removes the image which has been determined as NO (focus position) in the determination result of the image synthesis estimation circuit 115 and provides the instruction of capturing only the image which has been determined as YES (focus position). That is, the image capturing instruction circuit 117 provides the instruction of the focus position and the number of images to be captured, for the image which has been determined as YES. The number of image data sets which has been determined as YES by the image synthesis estimation circuit 115 is the number of image capturing times.

When image capturing instruction is provided in step S75, next focus movement is performed (S77). Here, the focus lens is moved sequentially to the focus positions indicated in the instruction of step S75 via the microcomputer 207 of the interchangeable lens 200.

After focus movement, next image capturing is performed (S79). Here, when the focus position indicated in the instruction of step S75 is reached, exposure is performed during a predetermined time while the exposure time is being controlled by the mechanical shutter 101, the image data is obtained from the imaging element 103 after the exposure time has elapsed, and this obtained image data is stored temporarily into SDRAM 127. Here, for the shutter, the electronic shutter in the imaging element 103 may be configured to be used instead of the mechanical shutter 101.

After image capturing, next it is determined whether the number in the instruction is reached or not (S81). Here, it is determined whether the number of image capturing times in step S79 reaches or not the number of images to be captured in the instruction of step S75. When the number in the instruction is not reached in the result of this determination, the process returns to step S77 and the image capturing is performed while the focus is being moved.

On the other side, when the number in the instruction is reached in the result of the determination in step S81, basic image processing is performed (S83). Here, the image data temporarily stored in SDRAM 127 is read out, and the basic image processing circuit 109a provides the image processing such as the OB subtraction processing, the WB correction, the color matrix operation, the gamma conversion, the edge enhancement, and the noise reduction.

After basic image processing, next alignment is performed (S85). Here, the alignment is performed for correcting the position shift of the captured image. In the alignment, for example, the two captured image are divided into blocks, a shift amount to a position where the correlation value between the blocks is the smallest is calculated, and the position may be aligned according to this shift amount.

After alignment, next depth synthesis is performed (S87). Here, the image synthesis circuit 109b performs the image synthesis for providing the effect of expanding the field depth. For example, a high frequency component is extracted from each of the images and the high frequency components are combined, and thereby an image having a deep field depth is generated.

After depth synthesis in step S87, or after basic image processing in step S93, the flow of image capturing & image processing is terminated and the process returns to the original flow.

In this manner, in the flow of image capturing & image processing, when the depth synthesis mode is set, the image capturing is performed while the focus position is moved, image synthesis estimation which performs the determination whether the image is suitable or not for the use in the synthesis is performed for each of the plurality of images obtained at this time (S73), the actual image capturing is performed moving the focus position according to the result of this determination (S77 and S79), and the depth synthesis is performed by using the image data obtained by the actual image capturing (S87). Since it is determined whether the image is suitable or not for the use in the synthesis, in the image synthesis estimation in advance of the actual image capturing, it is possible to secure a large number of images to be actually captured, and it becomes possible to generate the synthesis image having a sufficiently high image quality.

Figure 5:
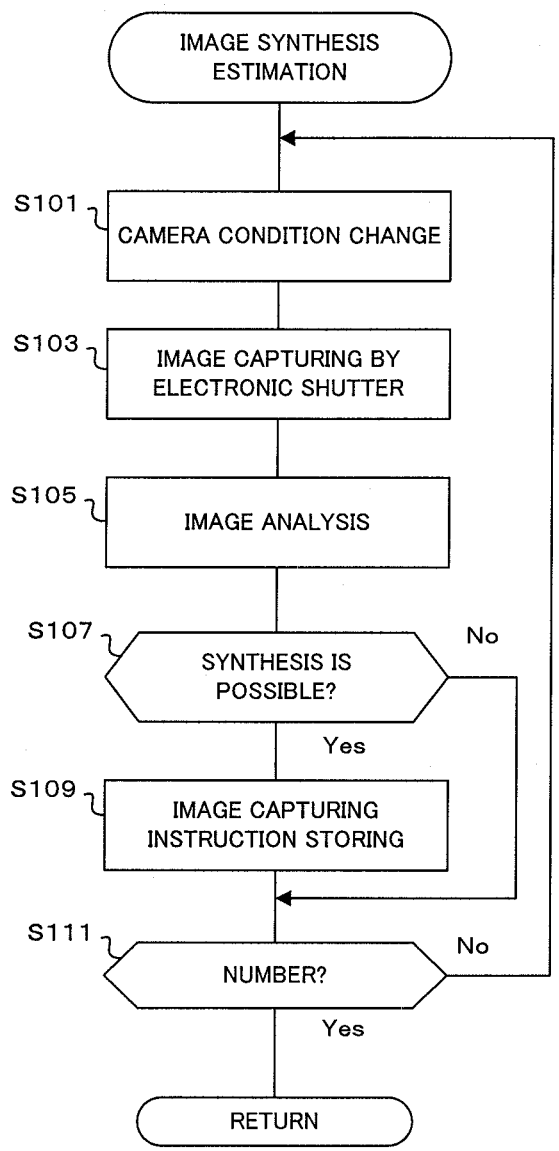
FIG. 5 is a flowchart showing the operation of image synthesis estimation in a camera according to one embodiment of the present invention.

Next, by the use of FIG. 5, image synthesis estimation in step S75 will be explained in detail. When the flow of image synthesis estimation is started, first camera condition change is performed (S101). Here, since the depth synthesis mode is set, the position of the focus lens is changed. Specifically, the drive 205 is caused to move the position of the focus lens by a predetermined amount via the microcomputer 207. This movement amount, while may be determined as needed according to the focal length, the set aperture value, and the like of the photographic lens 201, may be determined to be equivalent to the movement interval of the focus lens indicated in the instruction of the image capturing instruction circuit 117 in step S77.

After camera condition change, next image capturing by electronic shutter is performed (S103). Here, the exposure time is controlled by the electronic shutter in the imaging element 103 to obtain the image data. Since the image data obtained at this time is not used for the image recording but used for determining whether to be used or not for the image synthesis, the image size may be small for processing speed improvement. The electronic shutter is used because it is possible to perform the image capturing in a shorter time than by the mechanical shutter 101.

After image capturing by electronic shutter, next image analysis is performed (S105). Here, image analysis is performed for the image obtained by image capturing by electronic shutter in step S103. Image analysis is performed including the calculation of the contrast value of the object, comparison with the the previously captured image, determination whether a moving object or not, and the like. In the contrast analysis, the image is configured to be processed by the use of a band-pass filter (BPF) which extracts high frequency information from the image data, for example, and the peak value of an output from BPF may be configured to be used as a contrast amount of the image, or the contrast amount may be calculated by another method. Further, when the contrast amount can be obtained at the time of AF distance measurement in the first release (step S35), this result may be used.

Further, when the motion amount of the object is analyzed, for example, the image is divided into regions, correlation data is calculated with respect to the image captured at just previous focus position for each of the regions, this correlation data is compared with the correlation data in the surrounding regions or the average value of the whole correlation data, and, when the region having a large correlation difference exists, the motion amount of the object may be determined to be large. Further, when object tracking AF information or the like is obtained, it is determined whether the tracked object has motion or not, by the use of this tracking AF information, and the images captured at the previous and succeeding focus positions may be determined to be unsuitable for the synthesis image. The image analysis based on the contrast amount and the object motion will be described by the use of FIG. 6A to FIG. 7C.

After image analysis, next it is determined whether the synthesis is possible or not (S107). Here, it is determined whether the image is suitable or not for the use in the image synthesis, depending on the result of image analysis in step S105. For example, the image having a low contrast, the image of a moving object, and the like are determined not to be "combinable" because these images are not suitable for the synthesis, and the image having a high contrast, the image of a still object, and the like are determined to be "combinable".

When the image is determined to be combinable in the result of the determination in step S107, image capturing instruction storing is performed (S109). Here, the focus position which is changed in step S101 and the image capturing instruction are stored (flag may be set).

After image capturing instruction storing in step S109, when the image is not combinable in the result of the determination in step S107, it is determined whether the number of the captured image is reached or not (S111). Here, this determination is performed depending on whether or not the camera condition can be changed more times in step S101, or whether the number of flags set in step S109 reaches an upper limit or not, or the like. When the number of the captured image is not reached in the result of this determination, the process returns to step S101, and the determination whether combinable or not is continued while the camera condition is changed. On the other side, when the number of captured image is reached, the flow of image synthesis estimation is terminated and the process returns to the original flow.

In this manner, the flow of image synthesis estimation performs the image capturing (S103) when the camera condition is changed (S101), and determines whether the synthesis is possible or not, depending on the analysis result of the obtained image (S107). Accordingly, it is possible to reject the image unsuitable for the synthesis in advance of the actual image capturing and to perform efficient image capturing.

Next, the image synthesis estimation will be explained by the use of FIG. 6A to FIG. 7C. FIG. 6A and FIG. 6B show the case that the image synthesis estimation is performed using the contrast amount of the image data. FIG. 6A shows an example in which a flower 20, a person 30, and a mountain 40 exist as objects located as becoming apart from the near distance side to the far distance side of the camera 10.

The upper side of FIG. 6B shows the captured images and the contrast amounts when the focus position is changed. That is, the camera 10 moves the focus position in camera condition change of step S101, captures image estimation image 50 in image capturing by electronic shutter of step S103, and calculates the contrast amount in step S105. While the contrast amount becomes high at the focus positions corresponding to the flower 20, the person 30, and the mountain 40, the contrast amount becomes low at the intermediate positions. In the depth synthesis, the image captured at the intermediate focus position where the contrast amount is low is unsuitable for the synthesis.

Accordingly, as shown in the lower side of FIG. 6B, image 60a, image 60b, image 60s, and image 60d are determined to be unsuitable for the synthesis and skip the actual image capturing, because of small contrast amounts. That is, the image capturing instruction circuit 117 designates the images except images 60a to 60d to be image capturing instruction images 60.

The image synthesis estimation circuit 115 has a contrast amount determination threshold value for determining whether the image synthesis is possible or not, using the contrast amount of the image data, and, when the contrast amount is smaller than the determination threshold value, the image is determined to be unsuitable for the synthesis and the image capturing is skipped. This is because the object having a small contrast amount has a small region to be used for the synthesis in the the depth synthesis.

In this manner, in the present embodiment, the image synthesis estimation circuit 115 is configured to cause the estimation image data to be captured at the plurality of focus positions, to analyze the contrast of the estimation image data, and to perform the determination whether the synthesis is possible or not, depending on the contrast. That is, the image synthesis estimation circuit 115 determines that the image having a low contrast is not to be used.

Figure 7A:
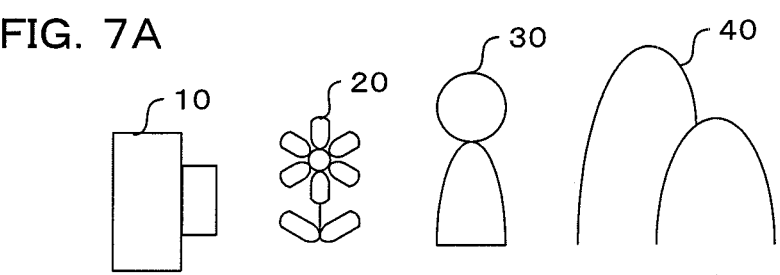
FIG. 7A to FIG. 7C are diagrams explaining image synthesis estimation to be performed using object motion in a camera according to one embodiment of the present invention.
Figure 7B:
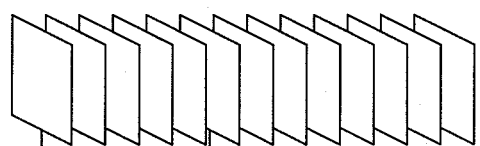
Figure 7C:
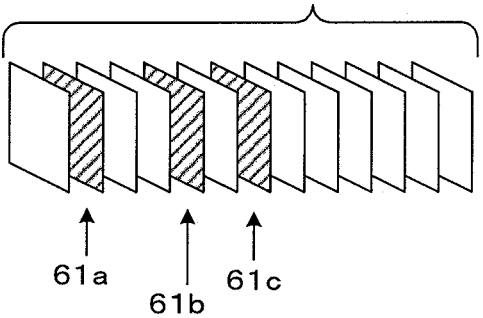

Next, FIGS. 7A to 7C show the case that the image synthesis estimation is performed using the object motion. Similar to FIG. 6A, FIG. 7A shows an example in which the flower 20, the person 30, and the mountain 40 exist as the objects located as becoming apart from the near distance side to the far distance side of the camera 10.

FIG. 7B shows the images captured while the focus position is being moved and the image having a large motion amount. That is, the camera 10 moves the focus position in camera condition change in step S101, captures image estimation image 51 in image capturing by electronic shutter in step S103, and calculates the motion amount in step S105. In this example, the flower 20 is swaying, and also the person 30 is moving. Further, as shown in FIG. 6B, the flower 20 and the person 30 are objects having large contrast amounts, and image 51*a* and image 51*b* are images having large motion amounts.

Accordingly, the present embodiment selects the image having the highest contrast among the images, and skips the image capturing at the focus positions before and after the focus position thereof. In an example shown in FIG. 7C, the actual image capturing is skipped at the focus positions corresponding to image 61*a* which is located before or after the flower 20 having a large contrast amount and has a large motion amount and images 61*b* and 61*c* which are located before and after the person 30 having a large contrast amount and have large motion amounts. That is, the image capturing instruction circuit 117 designates the image except images 61*a* to 61*c* as image capturing instruction image 61.

In this manner, in the present embodiment, the image synthesis estimation circuit 115 is configured to cause the estimation image data to be captured at the plural focus positions, to analyze the contrast of the estimation image data, and to perform the determination whether the synthesis is possible or not using the object motion. That is, the image synthesis estimation circuit 115 changes at least one condition (here, focus position) (refer to S101), causes the plurality of estimation image data sets to be captured (refer to S103), analyzes the movement amount of the object (refer to S105), and performs the determination whether the synthesis is possible or not, depending on the movement amount. When the object has motion, there is a possibility that the object becomes a ghost-image object in the image after the synthesis, and therefore the image synthesis estimation circuit 115 determines that the images captured at the focus positions before and after that of the image data where the object has a large movement amount is not to be used. In the present embodiment, it is possible to prevent the image generated by the depth synthesis from becoming a ghost image. Note that, while the contrast amount is used for the determination in addition to the object motion in the example shown in FIG. 7A to FIG. 7C, the determination may be configured to be performed only by using the object motion without using the contrast amount.

As explained above, one embodiment of the present invention performs the imaging step of obtaining the image by capturing the object by the imaging circuit (e.g., S79 of FIG. 4), the image synthesis step of combining the plurality of image data sets obtained in the imaging step (e.g., S87 of FIG. 4), the image synthesis estimation step of estimating whether the object possibly to be synthesized is included or not in the image synthesis step (e.g., S73 of FIG. 4), and the image capturing instruction step of instructing the imaging circuit to capture the image (e.g., S75 of FIG. 4), and, in the image capturing instruction step, provides the instruction of the image capturing in the plurality of times in the imaging step according to the estimation result in the image synthesis estimation step. Accordingly, it is possible to secure as many captured images as possible, and to generate the synthesis image having a sufficiently high image quality.

Further, one embodiment of the present invention is configured to provide the instruction of the image capturing for an image capturing frame which is estimated possibly to be combined in the image synthesis step. When the memory capacity of SDRAM 127 or the like is limited, the number of images to be stored at the same time is limited. According to the present embodiment, however, the actual image capturing is not performed for the image capturing frame which is estimated possibly not to be combined, and accordingly it is possible to use the memory effectively.

Note that, while one embodiment of the present invention performs the image synthesis estimation in image capturing & image processing (refer to S43 of FIG. 3) after the second release operation of the release button has been performed, not limited to this timing, the image synthesis estimation may be performed repeatedly at predetermined timing after the first release operation of the release button has been performed, for example.

Further, while one embodiment of the present invention explains the case that the depth synthesis mode is set for the image synthesis, obviously the image synthesis estimation may be configured to be performed also when another synthesis mode is set such as the HDR synthesis which expands a dynamic range, the ultra resolution synthesis which improves resolution, and the like, for example. In this case, the image analysis may be changed depending on the synthesis mode.

Further, while one embodiment of the present invention is configured to perform the image synthesis estimation in the image capturing and not to perform the actual image capturing of the image unsuitable for the image synthesis, not limited to this, the actual image capturing may be configured to be performed for all the images in the image capturing to store the image data into the memory, and the unsuitable image data may be configured not to be used for the image synthesis.

Further, while one embodiment of the present invention perform the explanation using the digital camera as a device for the image capturing, the camera may be also a single lens digital camera, a compact digital camera, a video image camera such as a video camera and a movie camera, and further a camera built in a mobile phone, a smart phone, a personal digital assistant (PDA), a personal computer (PC), a tablet-type computer, a game machine, or the like. Anyway, it is possible to apply the present invention to any image capturing device which can combine a plurality of image data sets. Further, the present invention can be applied to any image processing apparatus which can process a plurality of image data sets.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an imaging circuit to obtain image data by imaging an object;
an image synthesis circuit to synthesize synthesis image data using the image data;
an image synthesis estimation circuit to estimate whether an object possibly to be synthesized is included or not in the image synthesis circuit; and
an image capturing instruction circuit to instruct the imaging circuit to capture an image, wherein
the image capturing instruction circuit instructs the imaging circuit to capture a plurality of images according to an estimation result of the image synthesis estimation circuit,
wherein the image synthesis estimation circuit instructs the imaging circuit to capture the plurality of images in a plurality of different conditions, obtains a plurality of estimation image data sets to be used for the estimation, analyzes the plurality of estimation image data sets, and thereby performs determination whether image synthesis is to be performed or not according to the plurality of conditions, and wherein
the image synthesis estimation circuit changes at least one of the plurality of conditions, causes the plurality of estimation image data sets to be obtained, analyses a movement amount of the object, and performs the determination whether the image synthesis is to be performed or not, depending on the movement amount.

2. The imaging device according to claim 1, wherein the plurality of conditions is a plurality of focus positions of a focus lens.

3. The imaging device according to claim 2, wherein the image synthesis estimation circuit causes the estimation image data to be obtained at the plurality of focus positions, analyzes contrast in the estimation image data, and performs the determination whether the image synthesis is to be performed or not, depending on the contrast.

4. The imaging device according to claim 3, wherein the image synthesis estimation circuit determines that the image data having a low contrast is not to be used.

5. The imaging device according to claim 1, wherein the image capturing instruction circuit sets the number of image data sets which are determined to be used in the determination in the image synthesis estimation circuit to be the number of image capturing times.

6. The imaging device according to claim 1, wherein the image synthesis estimation circuit determines the images captured at the focus positions before and after the focus position of the image data having a large movement amount of the object is not to be used.

7. An imaging method, comprising:
an imaging step of obtaining image data by imaging an object in an imaging circuit;
an image synthesis step of combining a plurality of image data sets obtained in the imaging step;
an image synthesis estimation step of estimating whether the object possibly to be synthesized is included or not in the image synthesis step; and
an image capturing instruction step of instructing the imaging circuit to capture an image, wherein
the image capturing instruction step instructs the imaging step to capture a plurality of images according to an estimation result of the image synthesis estimation step,
wherein the image synthesis estimation step instructs the imaging circuit to capture the plurality of images in a plurality of different conditions, obtains a plurality of estimation image data sets to be used for the estimation, analyzes the plurality of estimation image data sets, and thereby performs determination whether image synthesis is to be performed or not according to the plurality of conditions, and
wherein the image synthesis estimation step changes at least one of the plurality of conditions, causes the plurality of estimation image data sets to be obtained, analyses a movement amount of the object, and performs the determination whether the image synthesis is to be performed or not, depending on the movement amount.

8. A non-transitory computer-readable medium storing a computer program for controlling a computing device arranged in an imaging device, comprising:
an imaging step of obtaining image data by imaging an object in an imaging circuit;
an image synthesis step of combining a plurality of image data sets obtained in the imaging step;
an image synthesis estimation step of estimating whether the object possibly to be synthesized is included or not in the image synthesis step; and
an image capturing instruction step of instructing the imaging circuit to capture an image, wherein
the image capturing instruction step instructs the imaging step to capture a plurality of images according to an estimation result of the image synthesis estimation step,
wherein the image synthesis estimation step instructs the imaging circuit to capture the plurality of images in a plurality of different conditions, obtains a plurality of estimation image data sets to be used for the estimation, analyzes the plurality of estimation image data sets, and thereby performs determination whether image synthesis is to be performed or not according to the plurality of conditions, and
wherein the image synthesis estimation step changes at least one of the plurality of conditions, causes the plurality of estimation image data sets to be obtained, analyses a movement amount of the object, and performs the determination whether the image synthesis is to be performed or not, depending on the movement amount.

* * * * *